(12) United States Patent
Harrington

(10) Patent No.: US 6,286,238 B1
(45) Date of Patent: Sep. 11, 2001

(54) LICENSE PLATE SECURITY SYSTEM

(76) Inventor: Curtis L. Harrington, Suite 250, 6300 State University Dr., Long Beach, CA (US) 90815

( * ) Notice: Subject to any disclaimer, the term of this patent is extended or adjusted under 35 U.S.C. 154(b) by 0 days.

(21) Appl. No.: 09/175,217

(22) Filed: Oct. 19, 1998

(51) Int. Cl.⁷ ....................................................... G09F 7/00
(52) U.S. Cl. ................................. 40/202; 40/201; 40/712
(58) Field of Search ............................ 40/201, 202, 712; 70/58

(56) References Cited

U.S. PATENT DOCUMENTS

| | | | |
|---|---|---|---|
| D. 415,987 | * 11/1999 | Romero | D12/193 |
| 1,514,339 | * 11/1924 | Reiser et al. | 40/210 |
| 2,710,475 | * 6/1955 | Salzmann | 40/202 |
| 3,432,954 | * 3/1969 | Ford | 40/202 |
| 4,182,062 | * 1/1980 | Krokos et al. | 40/209 |
| 5,659,986 | * 8/1997 | Simmons | 40/202 |
| 5,983,539 | * 11/1999 | Martin et al. | 40/202 |

* cited by examiner

*Primary Examiner*—Cassandra H. Davis

(57) ABSTRACT

A security system for a license plate, vanity plate or tag includes a bracket for mounting on a vehicle in the space conventionally supporting license plates and a lockable frame interfitting therewith. The bracket has at least one slot for engaging a tab carried by the frame, and another slot for engaging a locking member extending from a lock. The frame has apertures for supporting a license plate, and the frame and license plate are readily removable as a unit for storage in a high security area to prevent theft of the license plate, as well as to deter the installation of an unauthorized license plate as often hapens when the vehicle will be stolen. The system can be mounted with the lock on the top or bottom side, and one embodiment includes an open area in the frame opposite the lock. The lock is preferably a cam lock and is positioned to deter tampering. A bracket has upper and lower planar portions which may be angled with respect to a main planar portion. A first set of fasteners engages a license plate to the frame, while a second set of fasteners engages the bracket to a vehicle. Locking is achieved between the frame and bracket.

29 Claims, 10 Drawing Sheets

LICENSE PLATE SECURITY SYSTEM

FIELD OF THE INVENTION

The present invention relates to the field of automobile license plate accessories and more particularly to a security system for a license plate which facilitates lockability, quick interchange and security removal of the license plate to prevent theft, facilitate rapid interchange and provide high security through both sturdy secured lockability and removable transportability.

BACKGROUND OF THE INVENTION

Conventional automobiles have had little variation in license plate support mechanisms since the inception of the automobile. The main license plate is attached to the rear of the vehicle, using two to four fasteners provided through the four standard spaced holes found in the plate. The fasteners used are usually flat head screws which engage either a large structure supported by the vehicle, or some accommodation on the auto body such as a plastic insert or threaded clip. Some users may also have a license plate frame which is also supported by the same fasteners which support the license plate to the vehicle. Whether or not a frame is used, in most cases, the heads of the screws are exposed directly. Exposed screws invite and facilitate the theft of the license plate. Theft of the licence plates can be a nightmare for the vehicle owner. The plates are likely to be used on a car involved in a crime or to facilitate the theft of another car. If a car owner's license plates are stolen, the likely result is unwanted investigation and inquiries by the police agencies. An owner driving a car from which the plates are stolen is likely to be pulled over multiple times for a single car trip, since missing plates are automatic probable cause justifying traffic detainment by police.

Ease of plate removal also makes the owner's vehicle a more attractive target for theft. Once another vehicle owner's plates have been stolen, an ideal target vehicle should also have the capability for rapid easy license plate removal and replacement with the stolen license plates.

Other motives for stealing license plates involves careful removal of the tax payment/registration indicator label. The tax payment/registration indicator or verification label technology has advanced making the labels harder to counterfeit and much more difficult to remove while in tact. The theory is that if a thief can obtain the tax verification label only by destroying it that theft can be deterred. The deterrence mechanism is to provide an adhesive much stronger than the strength of the verification label, so that attempted removal will result in multiple torn chips which are impossible to re-apply to the thief's tag. However, where a thief can obtain a whole rear tag, by simple removal with a screw driver in less than one minute, the tag can be either soaked in an appropriate solvent, or heated to bring the adhesive to sufficient liquification that the tag can be slowly and carefully removed. In any event, where the thief has the removed tag and much more time to work on separating the verification label, the benefits of the theft can be realized relatively easily. The use of the tax payment/registration verification label of someone else is not likely to be detected, even on a routine traffic stop. The serial numbers on the tax payment/registration verification label are often small, written in dark ink and difficult to read without close inspection. As a result, police officers rarely take the time to initiate an investigation on the validity of the tax verification label.

Automobile license plates are most vulnerable in parking lots, and especially long term airport lots where the automobile is left for an extended period of time in an area not closely attended. When parking in a private garage, or where the vehicle is stored in a home garage for an extended period of time it would be preferable from a security standpoint to remove the tags and place them in a secure locked surrounding. Any surrounding which is more secure, including the passenger compartment of the car, the car trunk, or the ultimate security which comes with taking the license plates with you. The vehicle might then be stolen only if the thieves had additional license plates, for if the car was stolen and driven away with no plates, there would be a high likelihood that it would be stopped by the police and have its ownership challenged.

Although standard license plate attachment configurations permit ease of removal of the license plates, the use of a screwdriver is still required, as well as some sitting, stooping or squatting for a some time. In addition, the automobile bumper and areas surrounding the tag may be not completely clean, and extended time spent leaning on the car rear areas, sitting or squatting on the ground, and all of the necessary effort and tools to removing the license plate are unpleasant and egregiously time consuming. Often, a state's motor vehicle department requires the turning in and replacement of vehicle license plates. The user must find a tool kit, go to the car and begin removing the screws holding the plate in place. The user then enters the building for the exchange and then must go back to the vehicle and replace the screws again securing the vehicle license plate.

A similar, but less onerous set of steps is necessary in order to replace the tax payment/registration verification label. It is ideally desired to clean the license plate, remove last years tax payment/registration verification label and replace it with this years label applied onto a clean smooth surface. The ability of the use of adhesives stronger than the structural integrity of the tax payment/registration verification label to deter theft depends upon the availability of a clean, smooth surface. The user must either use a screwdriver to remove the tag to enable the tag to be either brought indoors or otherwise positioned so that the old tax payment/ registration verification label can be removed without damaging the surface. Otherwise, the user must spend more time around the attached license plate attempting to remove the tax payment/registration verification label without damaging the underlying surface. Additional time working around the vehicle translates into more opportunity for soiled clothes, tired back and more frustration. Removing the tax payment/ registration verification label can be a slow process. In addition, when working with the license plate on the vehicle, other techniques like running hot water over the license plate to soften the adhesive are impractical.

What is therefore needed is a system which protects against theft of a vehicle license plate when the license plate is carried on the vehicle, and which provides an even higher degree of security when the license plate is removed from the vehicle, by facilitating the quick removal from and re-placement onto the vehicle to facilitate such high degree security removal. The needed system should assist in keeping the license plate clean and also invite careful and precise replacement of the tax payment/registration verification label which is typically issued every year. The system should assist in protecting the surface of the license plate. The system should also provide further protection from damage to the license plate. The needed system should include additional protection against theft and vandalism by increasing the strength and thickness of the design, as well as providing tamper resistant structures and spaces to isolate the locking mechanism.

SUMMARY OF THE INVENTION

A security system for a license plate, vanity plate or tag includes a bracket for mounting on a vehicle in the space conventionally supporting license plates and a lockable frame interfitting therewith. The bracket has at least one slot for engaging a tab carried by the frame, and another slot for engaging a locking member extending from a lock. The frame has apertures for supporting a license plate, and the frame and license plate are readily removable as a unit for storage in a high security area to prevent theft of the license plate, as well as to deter the installation of an unauthorized license plate as often hapens when the vehicle will be stolen. The system can be mounted with the lock on the top or bottom side, and one embodiment includes an open area in the frame opposite the lock. The lock is preferably a cam lock and is positioned to deter tampering. A bracket has upper and lower planar portions which may be angled with respect to a main planar portion. A first set of fasteners engages a license plate to the frame, while a second set of fasteners engages the bracket to a vehicle. Locking is achieved between the frame and bracket.

BRIEF DESCRIPTION OF THE DRAWINGS

The invention, its configuration, construction, and operation will be best further described in the following detailed description, taken in conjunction with the accompanying drawings in which.

DETAILED DESCRIPTION OF THE PREFERRED EMBODIMENT

Figure 1:
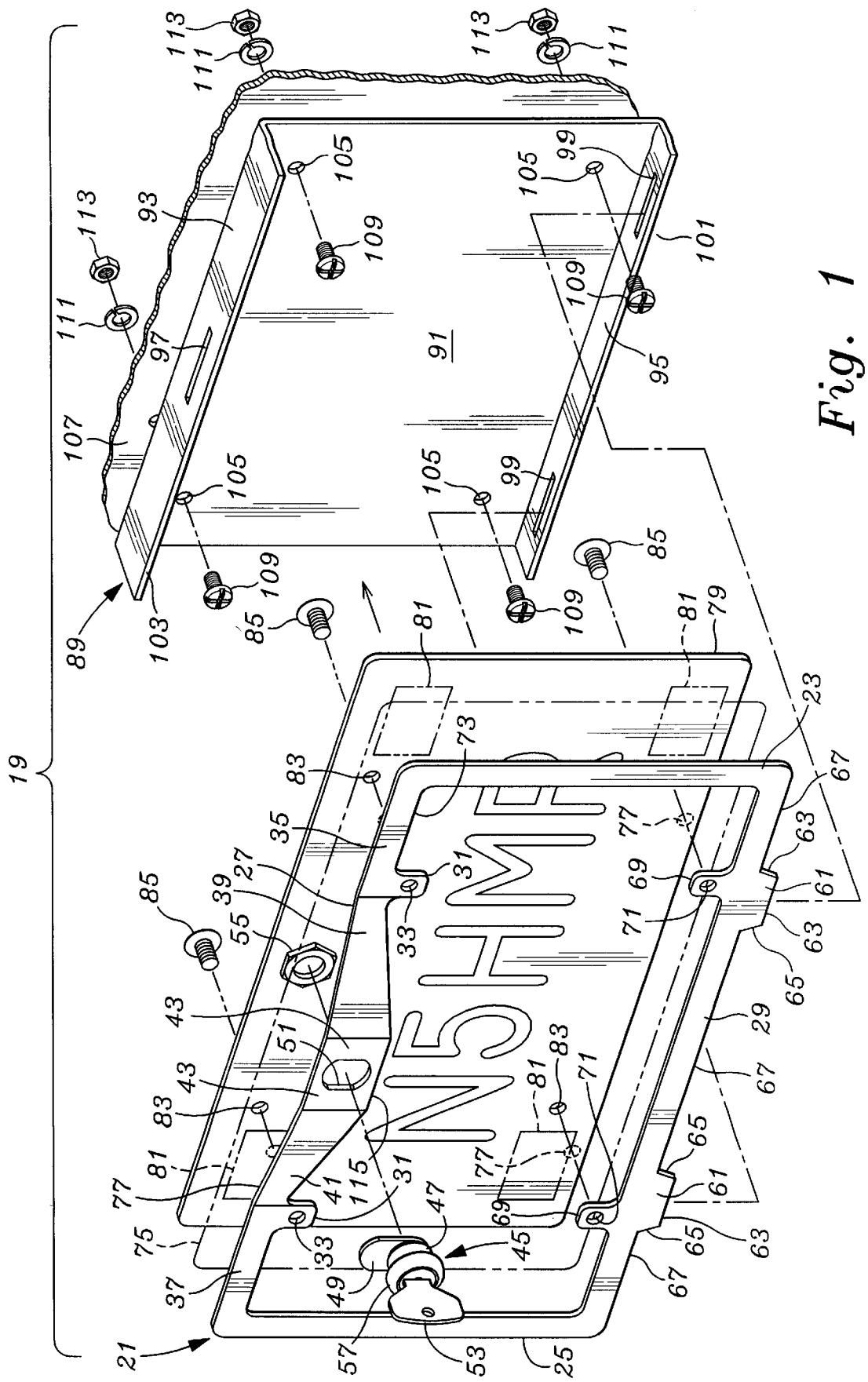
FIG. 1 is an exploded view of the license plate security system of the invention and illustrating the lock and frame, an optional clear interlayer, the license plate to be protected, bracket for attachment to a vehicle, as well as fasteners and attachment screws.

The description and operation of the invention will be best initiated with reference to FIG. 1 and which illustrates a vehicle license plate security system 19 shown in exploded view. Beginning at the left of FIG. 1, a frame 21 has a right portion 23, a left portion 25 a top portion 27 and bottom portion 29. The terms "top," "upper," "bottom," "lower," "right," and "left" and similar terms are only for the convenience of the reader and in accord with the general orientation of the drawings. The system 19 can be upside down or side to side from what is discussed and shown below.

Top portion 27 includes a pair of downwardly extending lugs 31, each having an aperture 33. Top portion 27 itself includes a top right portion 35 which lies in the same plane as the right portion 23 and a top left portion 37 which lies in the same plane as the left portion 25, portions 23, 25, 35, 37 and 29 all of which may be lying in a common plane. From the left of the top right portion 35, a top right angled portion 39 extends toward the center of the frame 21 and rising away the plane of top right portion 35. Similarly, a top left angled portion 41 extends toward the center of the frame 21 and rising away from the plane of top left portion 37. A top center portion 43 is preferably parallel to the plane of portions 23, 25, 35, 37 and 39, but displaced therefrom. Top center portion 43 lies in a plane which is at minimum separated from the plane of portions 35 and 37 to both provide a clearance space to accommodate a significant portion of a cam lock 45, and to provide a natural lifting and pulling structure to facilitate manual removal and carriage of the frame 21. Again, the system 19 can exist in any orientation. The lock 45 could be located at a corner, on the right or left, or bottom of the frame 21. The purpose of the system 19 as described is to be as universally applicable and fittable into as many present vehicle license plate support spaces as are possible. Where unlimited space and no physical limitations exist, other specialized systems can be used, but the system 19 is designed for maximum utilization as a retrofit item on existing automobiles. It may be provided as an original equipment structure, however, and the structure which is used to secure the frame 21 can be integrally provided on the vehicle.

Cam lock 45 has a body 47 and cam member 49 which will fit through an aperture 51 of the top center portion 43. The aperture 51 is not completely round and has flat sides which are complementary to matching flat sides (not seen in FIG. 1) of the body 47 of the cam lock 45, in order to insure that the cam member 49 will not rotate when the lock 45 is locked, by rotating the body 47 in the aperture 51. Lock 45 has a key 53 for operation of the lock 45, and lock 45 may allow key removal in both the locked and unlocked position. Shown to the rear of the aperture 51 is a locking nut 55 for engaging the lock tightly within the aperture 51.

Installation of the lock may be accomplished either before shipping of the system 19, or at the time of installation of the system 19. Installation of the lock 45 usually involves insertion of the cam member 49 through the aperture 51. As soon as the cam member 49 is through the aperture 51, the body 47 of the lock oriented so that the flat sides of the body 47 (not shown in FIG. 1) align with the flat sides of the aperture 51, at which time the body 47 can then be inserted through the aperture 51. Even though somewhat loose within the aperture 51, the body 47 cannot be rotated within the aperture 51 because of the complementary relationship of the flat sides of the aperture 51 engagement with the flat sides (not shown) of the body 47.

The body 47 of the lock 45 extends through the aperture up to a flange 57 which sets the limit of depth into aperture 51 through which the lock 45 can extend. The flange 57 is also typically a finished piece which presents a surface suitable for display. After the lock 45 is inserted to its limit through the aperture 51, the locking nut 55 is passed over the cam member 49, and then over a short portion of the body 47 at the start of the threaded portion of body 47. The locking nut 55 engages the threads on the body 47 of the lock 45 and the nut is tightened against the rear of the top center portion 43. The locking nut 55, combined with the flat sides of the aperture 51 and complementary flat surfaces (not shown in FIG. 1) of the body 47 of lock 45 act to fix the lock with respect to the frame 21. The only rotation possible after installation of the lock 45 is the rotation of the cam member 49 along with the core of lock 45 but only when operated by the key 53. Preferably the lock 45 will enable operation over a 90° span of angular displacement of the cam member 49. Lesser or greater spans of angular operation are possible, but a 90° span of angular displacement is believed to give the greatest economy of motion and time for quick release and re-securing of the frame 21.

The bottom portion 29 of the frame 21 has a pair of spaced apart tabs 61. Other variations include the use of one large tab, or greater numbers of smaller width tabs 61. Preferably, each of the tabs 61 includes a lower generally flat edge 63, and a pair of angled side edges 65. The angled side edges 65 extend from the terminal extent of the flat edges 63 and extend to a lower edge 67 of the bottom portion 29. As will be seen, the angle of the side edges provide a self centering action on the frame 21.

Bottom portion 29 includes a pair of upwardly extending lugs 69, each having an aperture 71. Apertures 33 of lugs 31 and apertures 71 of lugs 69 are arranged in a spatial configuration matching the standard hole separation of standard license plates produced by the state governments as well as novelty plates with professional and collegiate team names and emblems such as Auburn, Georgia Tech, University of Houston, University of Oklahoma, California State University Long Beach, and the University of San Diego, to name a few. The lugs 69 and 31 are arranged with regard to the areas of surrounding material including bottom portion 29, top right portion 35, top left portion 37, top right angled portion 39, and top left angled portion 41 to minimize the occupancy of areas around the lugs 69 & 31 and to provide as little blocking and to maximize as much as possible the viewing area of a viewing aperture 73 in the frame 21, but without loss of structural integrity of the frame 21.

Immediately behind the frame 21 is an optional clear plastic sheet 75. Plastic sheet 75 will preferably have apertures 77 which align with the apertures 33 and 71 of the frame 21. Immediately behind the plastic sheet 75 is a preferably standard sized license plate 79. The plate shown is an amateur radio vanity plate bearing call sign "N 5 HMR" and is one of the types of vehicle license plates issued by the State of Oklahoma and which may have one or more of the rectangular areas 81 set aside for supporting tax payment/registration indicator labels. Four such rectangular areas 81 are shown since different states use different areas of the license plate 79 upon which the tax payment/registration indicator labels are typically adhered. In general however, the four rectangular areas 81 are predominantly used, and typically two of such rectangular areas 81 are used. Of the two areas 81 used, one will typically illustrate the month of renewal of the tax payment/registration while the other illustrates the year of renewal. It is usually the year renewal area and year indicator label which needs careful and complete removal to leave a smooth surface for the next year's renewal indicator label. Insuring that the rectangular areas 81 will be seen through the viewing aperture 73, areas of the frame 21 around the lugs 31 and 69 have been removed, and especially those areas in front of the rectangular areas 81.

With regard to the plastic sheet 75, the same type of plastic which is used for report binders can be used. This plastic is tough, does not tear easily when the apertures 77 are hole punched, but may be unduly shiny. Alternatives for plastic sheet 75 include frosted or non-glare sheets which enable the identification numbers and letters of the license plate 79 to be easily read with no reflective glare. Another possibility includes the use of a contact plastic sheet, having a sticky side similar to that used for shelf paper and book covers. This type of plastic sheet is easily removable to change the tax payment/registration indicator labels in the rectangular areas 81.

As can be seen, the license plate 79 has a series of four apertures 83, three of which are seen in FIG. 1, and which correspond with the apertures 77 of the plastic sheet 75 and the apertures 33 and 71 of frame 21. The frame 21 is designed to have the license plate 79 attached to the frame 21 with a series of from one to four fasteners 85. Fasteners can be preferably snap fasteners 85 or rachet fasteners 85 or bolts 85 for threadable engagement of either the apertures 33 or 71, or optional nuts, not shown. Snap fasteners are removable and enable removal of the frame 21 with respect to the license plate 79. Rachet fasteners are usually irreversible in their application and will not become detached without destruction and replacement with new ratchet fasteners 85. Removal is usually effected with wire cutters or the like. If ratchet fasteners 85 are used it is preferable to use nylon ratchet fasteners for ease of application. Relatively soft ratchets enable nylon ratchet fasteners 85 to be easily installed.

To the rear of the tab 79 and fasteners 85 is a bracket 89. Bracket 89 has a main planar portion 91, an upper planar portion 93 at an angle with respect to the main planar portion 91, and a lower planar portion 95 also at an angle with respect to the main planar portion 91. The upper planar portion 93 has a cam member slot 97 for engaging the cam member 49. The lower planar portion 95 has a pair of tab slots 99 for interfitting with the pair of spaced apart tabs 61 of the frame 21. The tab slots 99 are shown as aperture openings, but it is not necessary that the slot be totally enclosed. Where the tab slots 99 are formed near the outside boundary of the bracket 89, they may become open slots to the outside. In this case, only the inner facing angled side edges 65 will contribute to the centering of the frame 21. Another factor in enabling the tab slots 99 to become open tab slots includes the choice of thickness of material from which the bracket 89. Where the thickness of material is great enough that the use of an open slot 99 will not threaten the security level of the locked system 19, a slot 99 which is open would be permissible.

Note that the lower planar portion 95 has the bulk of its linear width in good supportive attachment to the main planar portion 91, as is the upper planar portion 93. The thickness of the materia from which the frame 21 and bracket 89 is selected is such as to resist any significant downward or upward bending forces on the upper or lower planar portions 93 or 95. The use of a single extended tab 61 and a single extended width slot 99 could be used, but only to the extent that the lack of material due to the presence of an extended width tab slot not significantly contribute to a reduction of strength so that a lower edge 101 of the lower planar portion 95 would fail to adequately resist bending. Although bending would not necessarily result in release of any tab 61, and since one of the many purposes of the bracket 89 is to protect the license plate 79, a geometry which preserves the integrity of both the upper and lower planar portions 93 and 95 is preferable. An upper 103 should also resist any reasonably strong bending forces to protect both the upper portion of the frame 21 and license plate 79.

Main planar portion 91 has a series of four apertures 105 which are also configured to match the spacing of standard license plate apertures so that the bracket 89 can be attached to a vehicle surface 107, a portion of which is visible in FIG. 1. The structures which are available on a standard vehicle for attachment of a license plate 79 can be used to support the bracket 89. Some of these configurations include spring clips, plastic inserts, bolts, threaded bores and more. In the configuration of FIG. 1, a heavier duty installation is seen, where a set of four standard threaded fasteners 109 are secured on the other side of the vehicle surface 107 by a series of lock washers 111 and nuts 113 which may be lock nuts 113.

The angular configuration of bracket 89 seen in FIG. 1 is such that a plane of upper planar portion 93 is at a right angle to a plane of main planar portion 91. A plane of lower planar portion 95 is at a right angle to a plane of main planar portion 91. The plane of the upper planar portion 93 and the plane of the lower planar portion 95 are preferably parallel to each other.

The problem presented by the license plate attachment area is that of physical restriction. Some vehicle license plate areas have a lower restriction. For example, a pickup truck heavy bumper has a lower step plate. A lower planar portion 95 which is at a right angle to the main planar portion 91, and horizontal where the vehicle surface 107 is vertical, enables the bracket 89 to more readily interfit in such an environment. Conversely, some vans have a license plate attachment area under a lip in the outside body. An upper planar portion 93 which is at a right angle to the main planar portion 91, and horizontal where the vehicle surface 107 is vertical, enables the bracket 89 to more readily interfit in such an environment. Having both the upper planar portion 93 and lower planar portion 95 extend horizontal insures that the system 19 takes up the minimum space and thus has maximum applicability.

Vertically, the spacing by which the frame 21 exceeds the vertical height of a license plate 79 is minimized. The width of the frame 21 is set to only marginally overlap the outer edges of the license plate 79, in order to enhance appearance of the system 21. In other configurations, where the physical limitations of the license plate attachment area or limitation of the vehicle surface 107 so allow, the upper planar portion 93 and lower planar portion 95 attain an angle with respect to the main planar portion 91 which is greater than a right angle.

In addition, the frame 21 can be stamped directly from a flat planar expanse of metal sheet. The thickness of the bracket 89 and frame 21 is preferably from about 20 gauge metal to about 8 gauge. The stamping process which produces the frame 21 can occur in a single step, to both cut out the frame 21, the viewing aperture 73 and to make the apertures 33, 71, and 51. The displacement of the plane of the top center portion 43 away from a plane of the top left portion 37 and top right angled portion 39 requires a slight addition of material, more than simply the width of the frame 21 if punched from a single sheet of metal. The starting outline of the frame 21 will be slightly trapezoidal in order to include the top right angled portion 39 and top left angled portion 41 such that the frame 21 is rectangular after stamping.

A significant feature of the system 19 is that it provides a structure which enables license plate 79 to be locked into the frame 89, but without the need to drill through the license plate 79. The bulk of the lock 45 body 47 and locking structure is placed behind the frame 21 and yet in front of the license plate 79. As a result it is protected from significant tampering. Where no protective flap is provided from a lower edge 115 of the top center portion 43, it is possible, but relatively difficult to access the space between the top center portion 43 and the front of the license plate 79. First, the person seeking to tamper with the lock must know that a nut 55 exists behind the top center portion 43. Second, a sufficiently thin wrench must be provided to loosen the nut from a working position in front of the frame 21.

Using the most shallow lock 45 will result in a distance from the face of the license plate 79 to the front surface of the top center portion 43 of about 0.5 inches. Subtracting the thickness of material of about 0.06 leaves a width of only about 0.44 inches. The locking nut 55 is quite thin and in locked position is tight against the rear face of the top center portion 43. A wide wrench will be pushed back toward the license plate by the top right angled portion 39 and the top left angled portion 41 and thus be unable to easily or effectively engage the locking nut. An adjustable wrench or one which is too thick will be simply be too big to engage and loosen the locking nut 55.

In addition, where a thinner frame 21 is used, note that the fasteners 85 enable the license plate 79 and the frame 21 to structurally reinforce each other. Where great amounts of mutual reinforcement is needed, the fasteners 85 would preferably be stronger so as to not constitute the weak link. The double layer sandwich formed by the combination of the license plate 79 and the frame 21 further prevents any pulled or compression bending of the top right angled portion 39, top left angled portion 41, or the top center portion 43 either toward or away from the license plate 79. Mutual reinforcement also adds to the structural integrity of the completed and locked system 19.

Figure 2:
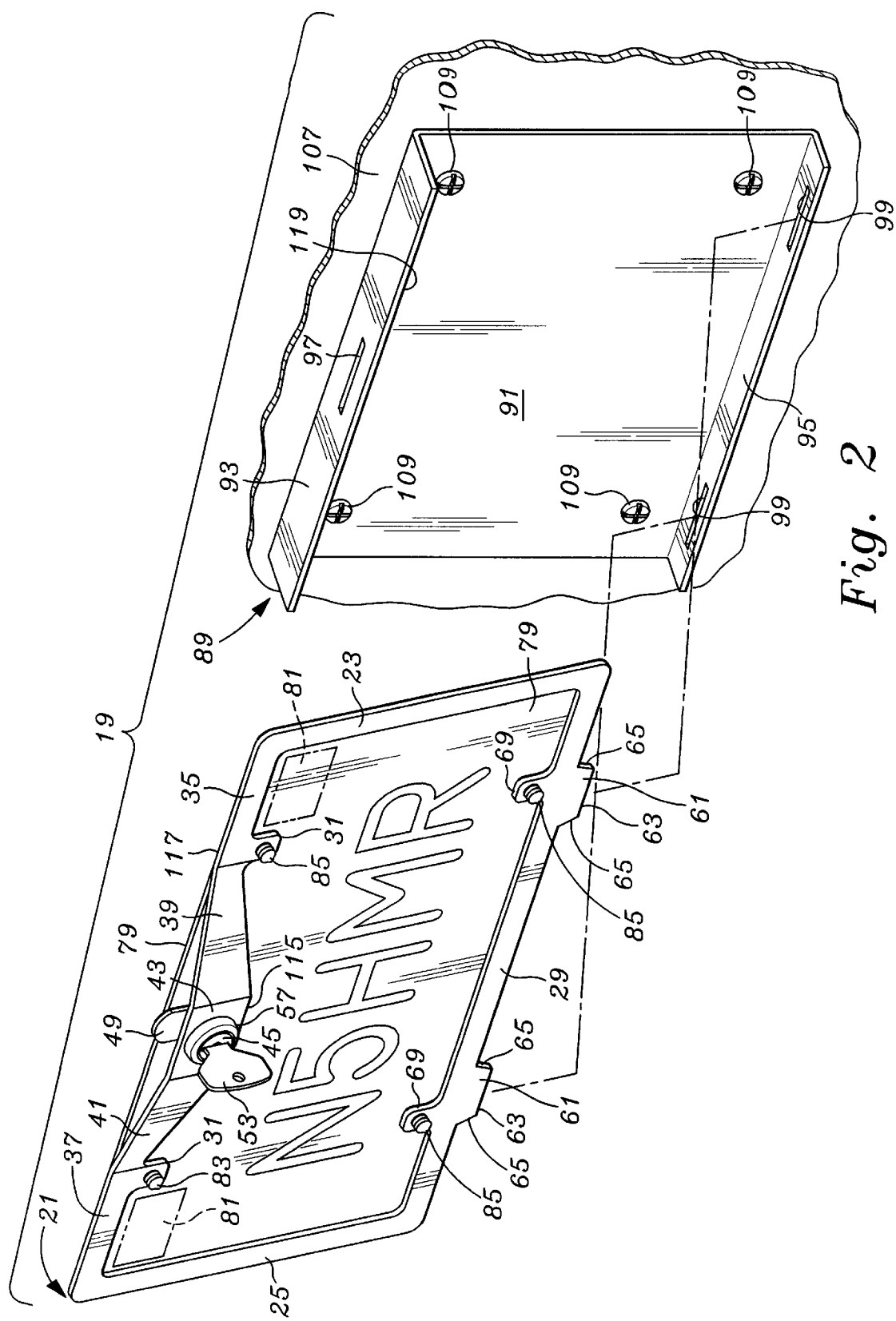
FIG. 2 is a configuration of the license plate security system without the interlayer and illustrating the bracket in place on a vehicle and the approach of the frame with lock and license plate attached and before the locking cam member is pivoted to a position to enable the frame to be put into place.

Referring to FIG. 2, the system 19 is shown in a condition ready for use, but omitting the plastic sheet 75 which was seen in FIG. 1. The bracket 89 is shown attached to a contiguous area of vehicle surface 107 with the standard threaded fasteners 109 shown as holding it into place. Where the threaded fasteners and the engagement threads of the vehicle surface 107 are sufficiently strong, the threaded fasteners which were supplied with the vehicle may suffice. However, for heavy duty installations, nuts 113 can be used on much stronger, larger diameter fasteners, and increased sized holes can be drilled through the vehicle surface 107 and increased size apertures 105 can be provided on the main planar portion through drilling to accommodate larger diameter fasteners 109. The system 19 can be as heavy duty as the choice of materials will allow.

Note in FIG. 2 that the license plate 79 and frame 21 combination approaches the bracket 89 at an angle so as to engage the pair of spaced apart tabs 65 into the pair of tab slots 99 before engaging the cam member 49 with the cam member engagement slot 99. As this approach is expected, given the inventive design, the width of the tab slots 99 should be sufficiently wide to accommodate and receive the tabs at an angled approach of the frame 21. The law of sines and cosines are preferably used to compute the width of the tab slots dependent upon the expected angle of approach and the thickness of material both in the tabs 61 and the thickness of material of the lower planar portion 95 which will also affect the width of the slots 99 sufficient for the tabs 61 to clear.

The frame 21 and license plate 79 combination seen in FIG. 2 can be easily grasped by engagement of the holder's fingers along the underside of the top right angled portion 39, top left angled portion 41, and top center portion 43. The tabs 61 can be guided into the tab slots 99 by sliding the bottom of the tabs 61 along the top surface of the lower planar portion 95 until they engage the tab slots 99. This can be done with one hand and is thus easy and quick. Because the tabs 61 have a bottom surfaces which are narrower than the width of the tab slots 99, it is easy to visually center the tab slots 99 well enough for quick insertion. Once insertion begins, the angled side edges 65 engage the end portions of the slots 99 to begin to center the tabs 61 as the uppermost portions of the side edges are seated in the tab slots 99. As the lower edge 67 is brought to rest atop the lower planar portion 95, the uppermost extent of the side edges 65 should engage or at least come very close to the terminal extent of the slots 99 in order to center the frame 21 with respect to the bracket. This arrangement not only provides centering, but makes engagement of the frame 21 into the bracket 89 very easy and convenient.

Once the lower edge 67 is brought to rest atop the lower planar portion 95, the upper side of the frame 21 can be pivoted into the bracket and underneath the upper planar portion 93. Ideally the clearance between an upper edge 117 of the frame and an underside surface 119 of the bracket 89 will be sufficient to present no interference between the upper edge 117 as it passes by the underside surface 119. The clearance will be based more upon manufacturing tolerance in the size of the frame 21 and the controllability of the angle of bend of the upper planar portion 93 and lower planar portion 95 with respect to the main planar portion 91, than on any dimensional need for any significant clearance magnitude.

Before being pivoted into place, the cam member 49 is pivoted using the key 53, either to the left or to the right to make sure that the top portion of the frame 21 will clear the underside surface 119 of the bracket 89. The location of the cam member engagement slot 97 and pair of tab slots 99 from the main planar portion 91 is designed to accommodate the height of the heads of the fasteners 109, the height of the heads of the fasteners 85, the thickness of the license plate 79 as well as any rim or continuous bump edge on the license plate 79. In many cases a bump or rim displaced from a main plane of the license plate will not significantly add to the clearance space between the frame 21 and bracket 89, but simply project rearward, leaving the rear of the main portion of the license plate 79, and thus the license plate 79 thickness as the only contribution to the occupation of the clearance space between the rear of the frame 21 and the front of the main planar portion 91.

In addition, the additional width, in a direction normal to the main planar portion 91, should be achieved by widening the slot in the direction of planar portion 91 to insure that the frame 21 will be nearly vertical when locked into place. If the clearance at the rear of the top of the frame 21 is about the same as the clearance for the rear of the bottom of the frame 21, the frame will be vertical as it is in place with the bracket 89. Any extra clearance to enable the frame 21 and license plate 79 combination to be inserted into the lower planar portion 95 at an angle should therefore be in the tab slots 99 in the direction of the planar portion 21.

Figure 3:
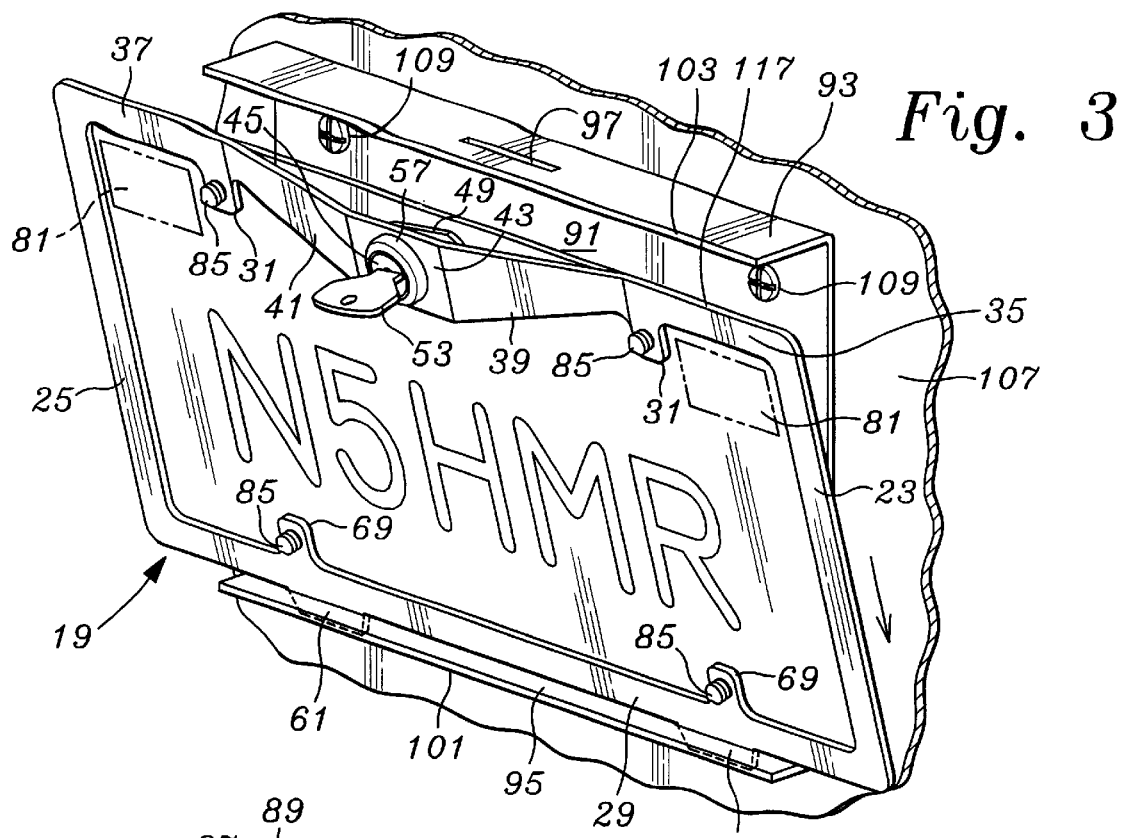
FIG. 3 is an illustration of the insertion of lower tabs of the frame into mating slots on the bracket, and illustrating the locking cam member pivoted to a position to enable the frame to be put into place with respect to the bracket.

Referring to FIG. 3, the frame 21 and license plate 79 combination is seen in a position just before locked engagement with the bracket 89. The key 53 has been turned to the right, clockwise, although it could just as easily have been turned counterclockwise and to the left. The cam member 49 is lying nearly horizontal to the right to enable the upper edge 117 of the frame to clear the underside surface 119 of the upper planar portion. The locking can occur in two separate steps or one combination step. In two steps, the upper side of the frame 21 can be pushed back into the bracket 89, followed by a turn of the key 53 once the cam member 49 is aligned with the cam member engagement slot 97. Alternatively, once the cam member 49 initially clears the upper edge 103 of the bracket, slight upward movement of the cam member 49 will cause it to slide along the underside surface 119 of the upper planar portion 93 until it "finds" the cam member engagement slot 97, the angular pivoting of the upper end of the frame 21 and license plate 79 combination coming to a stop as the cam member 49 continues to its vertical locking orientation, shown in FIG. 4.

Figure 4:
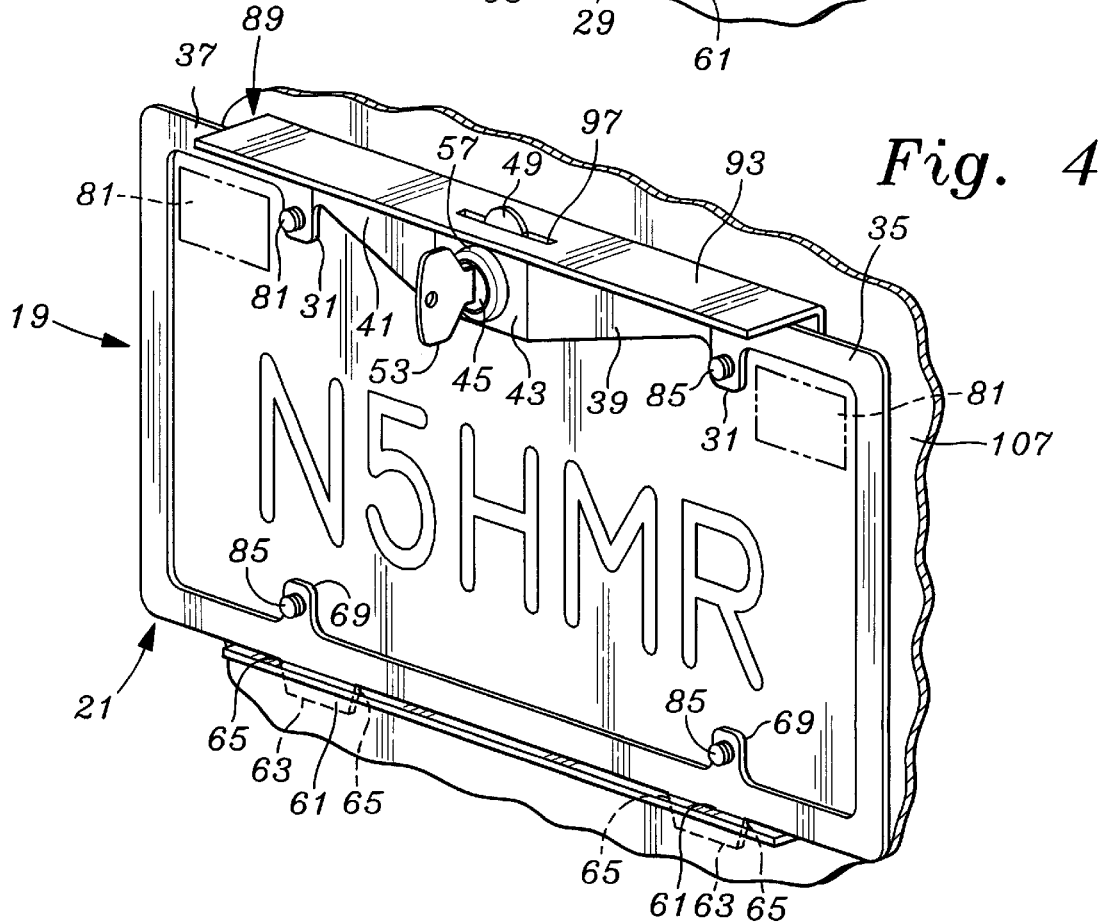
FIG. 4 is an illustration of the fame fully engaged by the bracket and with the locking cam member pivoted to a locking position engaging an upper slot of the bracket.

In FIG. 4, the frame 21 is in locked position and all that need be done is removal of the key 53. Ideally, the lock 45 is chosen to have the shortest body 47 possible, all other things being equal, in order to enable a low profile in the horizontal direction, to minimize angular forces on the lock 45, and to decrease the space behind the top center portion 43 to further restrict access to the underside of the lock.

FIG. 4 emphasizes the relatively flat profile of the system 19. The tabs 61 protrude downward only to the extent needed to securely engage the frame 21 with respect to the lower planar portion 95. The protrusion of the cam member 49 through the cam member engagement slot 97 is minimal and only extends far enough above the upper planar portion 93 to securely engage the frame 21 with respect to the upper planar portion 93. Due consideration should be given to the thickness of the material from which the bracket 89 and frame 21 are constructed. Thicker metal will translate to a need for a lesser protrusion of the cam member 49 outside the upper planar portion 93, and a lesser protrusion of the tabs 61 through the bottom of the lower planar portion 95. This occurs not only because thicker, stronger materials are less yielding, but because thicker materials will naturally reduce the extent of protrusion.

As can also be seen from FIG. 4, two of the rectangular areas 81 are shown and clearly seen. Also note the width of the bracket 89. Bracket 89 can be equally as long as the frame 21. However, because bracket 89 has a configuration of apertures 105 which are dictated by standard vehicle spacing, increasing the width of the bracket 89 will not increase resistance to side bending unless further apertures similar to apertures 105 are provided closer to the far lateral sides of the bracket.

Note in FIGS. 1–4 that the threaded members 109 are completely covered by the license plate 79 and lugs 31 and 69 of the frame 21. So long as the frame 21 is locked onto the bracket 89, the ends of the threaded members 109 are covered and inaccessible to remove the bracket 89. Access to the rear of vehicle surface 107 is still possible, but with the ends of the threaded members 109 are covered, removal from behind the vehicle surface 107 is likely to result in spinning threaded members 109 and near impossibility of removal in this manner.

Security of the license plate 79 is thus heightened significantly when the frame 21 and license plate 79 combination is secured with the lock 45 into the bracket 89. The effort to remove the frame 21 and license plate 79 combination is at least as high as the effort which would be required to remove threaded members 109 which were securing the license plate 79 directly. In addition, the system 19 affords the user a very high degree of security when the frame 21 and license plate 79 combination is unlocked and removed from the bracket 89. The license plate 89 in a conventional configuration could also be removed, but the trouble and effort required to remove and re-attach a license plate 89 directly make removal of the license plate by the owner for security reasons an unrealistic option. The system 19 facilitates removal as often as the vehicle operator believes that enhanced security is necessary. Any structure which did not restrict removability from a lockability standpoint would invite vandalism. Even if constructed of very thin material which would be subject to removal by destructive leverage, the system 19 can still provide the ultimate security achievable in removability, even if the effort and trouble associated with removal were even less that which would be required for removal of a conventionally mounted license plate.

Security of the system 19 can also be increased by increasing the structural integrity of the lock 45, threaded members 109 and the materials of construction of the the frame 21 and bracket 89. More than one lock 45 can be used. Lock 45 could have an extending cam member instead of a rotational cam member 49. Any number of other structures and other considerations can be used to heighten the security of the system 19 as it supports the the frame 21 and license plate 79 combination within the bracket 89. However, no other system facilitates the user's ability to quickly place the license plate in total into a higher security surrounding. No other system facilitates the user's ability to quickly replace the license plate onto a vehicle from its higher security surrounding.

The higher security surrounding includes cases where the user takes the license plates with them. For example, where a user is to be out of town for a week and must garage the car, a number of worries arise. The employees of the garage may "borrow" the car. A thief may attempt to steal the license plate 79. A thief may attempt to steal the car and substitute another license plate onto the car. First, upon seeing the system 19, a thief is more likely to consider stealing another vehicle rather than go to the extra time and effort of figuring out how to circumvent the system 19, or rather than risk damaging the vehicle to remove the license plate 79. When a thief or unauthorized user finds the frame 21 and license plate 79 missing, neither would be likely to take the vehicle for a drive. The frame 21 and license plate 79 combination could be packed in a bag or suitcase and replaced on the vehicle when the user returns from the trip.

Figure 5:
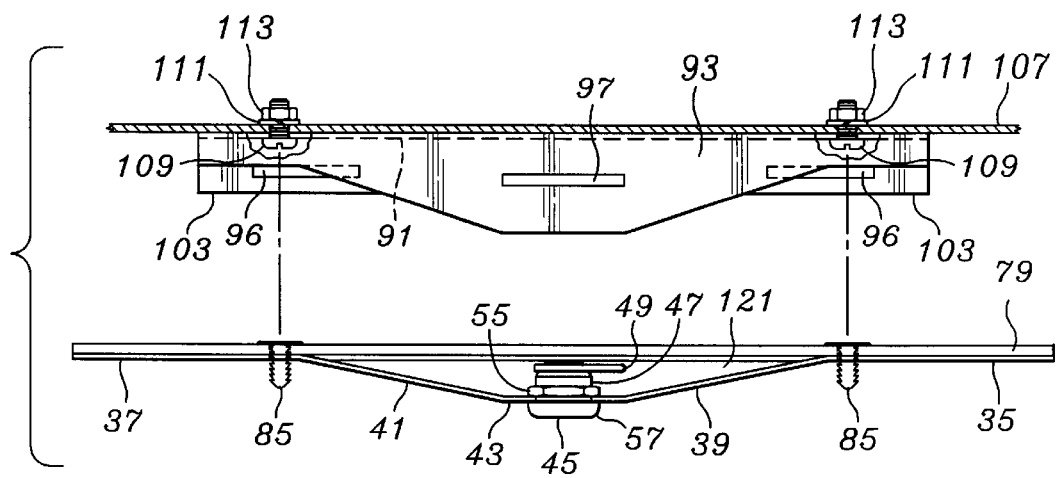
FIG. 5 is a downward view of the frame and license plate assembly parallel to and distanced somewhat from the bracket and illustrating an upper planar portion of the bracket which follows the front profile of the upper portion of the frame.

Referring to FIG. 5, the low profile is also illustrated, and a variation on the bracket 89 is shown which has an angled notch 120 on either side. The angled notch enables the bracket 89 upper planar portion to more closely follow the front profile of the upper portion of the frame 21, including top right portion 35, top left portion 37, top right angled portion 39, top left angled portion 41, and top center portion 43.

The lock 45 flange 57 is seen in front of the top center portion 43. Behind the top center portion 43, the body 47 of the lock 45 is seen to be extremely short. The lock nut 55 and cam member 49 is also seen and are of very short magnitude. As seen, the body 47 is about as long or deep as the lock nut 55 and also about as deep or thick as the thickness of the cam member 49. This very short profile provides a very small space 121. The smallness of the space 121 makes it difficult to tamper with the lock nut 55, but provides more than adequate structure for physically manipulating into and out of position with respect to the bracket 89. The clearance between a rear surface of the cam member 49 and the main planar portion is dictated by the license plate 79 thickness, head height of the fasteners 109 and head height of the fasteners 85. But the clearance between the cam member 49 to the upper edge 103 is dependent upon the length of the body 47 of the lock 45. The preferable length of the body 47 of the lock 45, is as short as possible.

Figure 6:
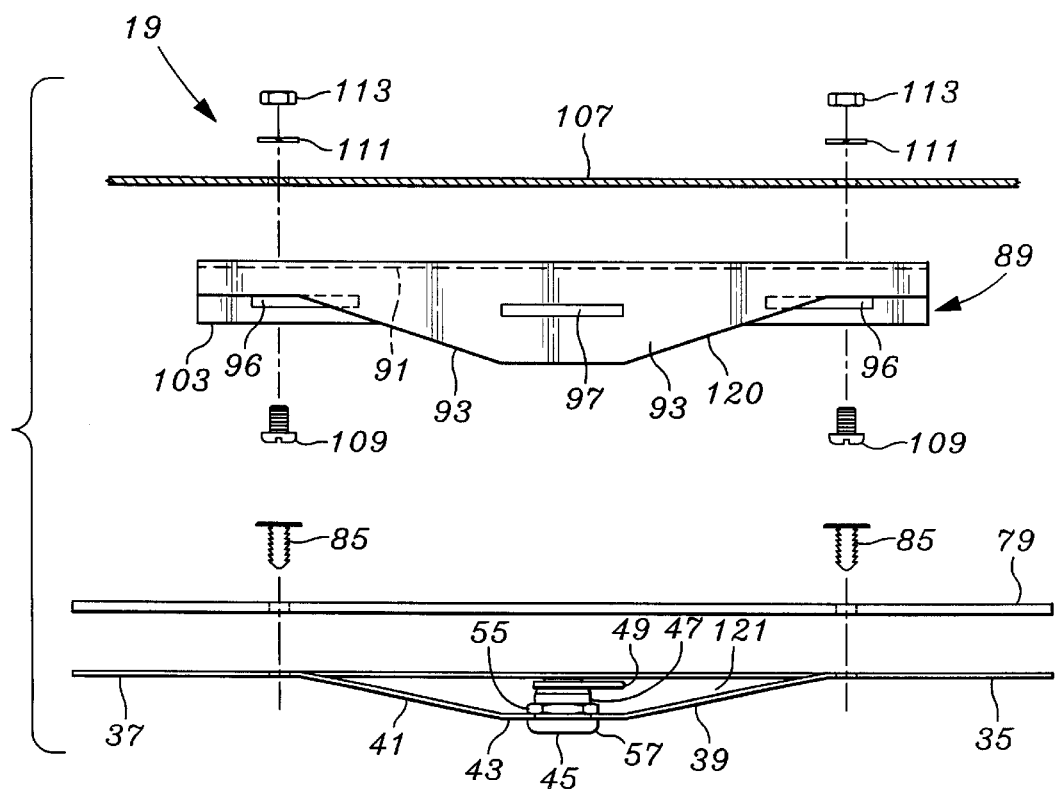
FIG. 6 is a downward view of the frame and license plate assembly as seen in FIG. 5, but in exploded view to illustrate the order of attachment of the components of the assembly.

Referring to FIG. 6 a view similar to the view of FIG. 5 is shown in exploded view to emphasize the two different directions of attachment. The view of FIG. 6 illustrates more directly the meeting of the heads of the fasteners 109 and 85. Note that the heads of the fasteners 85 are of extremely low height. The force to be supported by the bracket 89 is significant and thus the fasteners 109 have a greater head height. The fasteners 85 will not experience high axial force and thus do not need significant head height. Further, since the fasteners 85 lend stability to the frame 21 and license plate 79 combination, its lateral strength is important, its ability to enable the frame 21 to draw stability from the license plate 79. The dependency will increase with decreasing material thickness of the frame 21 and decrease with increasing material thickness of the frame 21.

Figure 7:
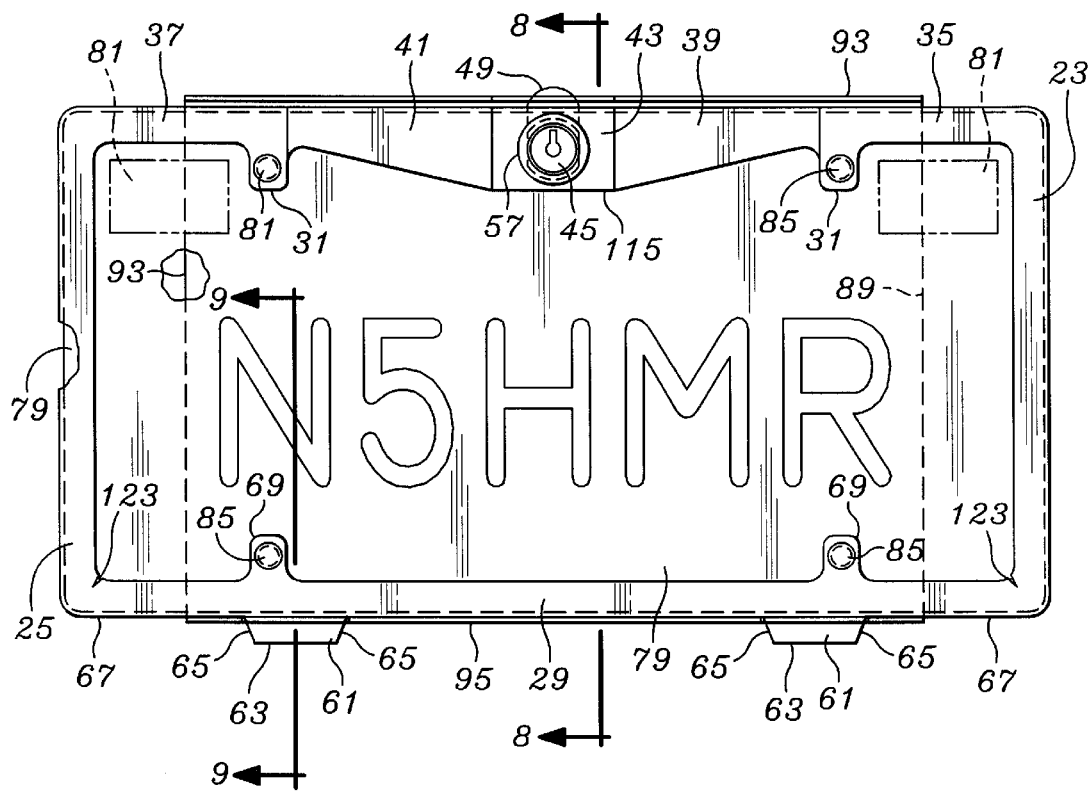
FIG. 7 is a frontal view taken with respect to the license plate security system and which illustrates the bracket, lock and emphasizes the level of insignificance of any obstruction of viewing area of the license plate, and that areas reserved for tax label application remains clear.
Figure 8:
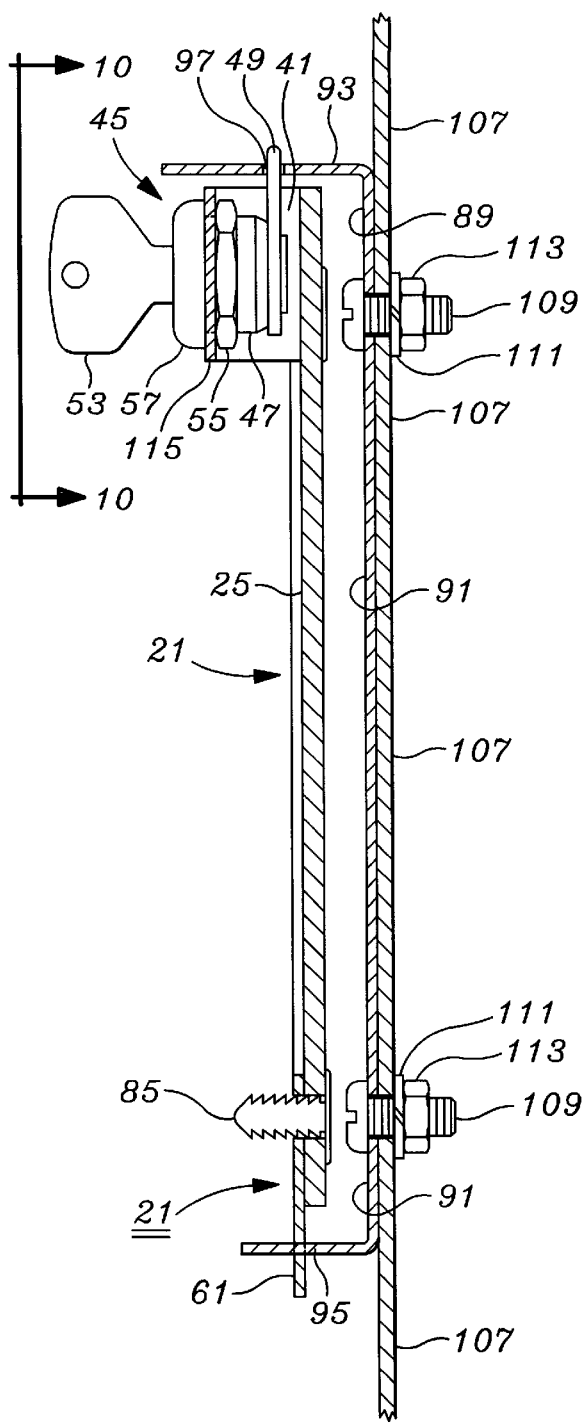
FIG. 8 is a side view of the system of the invention in locked position and supporting a license plate with respect to a surface and which illustrates the clearance between the bracket and rear of the license plate and occupation of the clearance by the head of the threaded fastener supporting the bracket and by the head of the threaded fastener supporting the license plate onto the frame.

Referring to FIG. 7 a plan view of the system 19 is seen. This view especially emphasizes that the system 19 is only marginally vertically larger than the license plate 79. Referring to FIG. 8 a side sectional view taken along line 8—8 of FIG. 7 illustrates the lock 45, license plate 79, frame 21 and bracket 89 emphasizing the clearance between the rear of the license plate 79 and the opposing side of the main planar portion 91. Some additional clearance remains between the head of fastener 85 and the head of fastener 109. This enables the system 19 to accommodate larger thickness license plates 79, as well as threaded members 109 with greater head height and or fasteners 85 with greater head heights.

In addition the lower corners of the frame 21 are shown with stress relief notches 123. As will be shown, the frame 21 can be formed from a flat, very slightly trapezoidal flat frame. When the top right angled portion 39 and top left angled portion 41 is formed, the additional material required bring these structures forward, will then bring the upper corners of the frame 21 inward to form a completed rectangular form. In the alternative, the top right angled portion 39 and top left angled portion 41 could be formed before the outside of the frame 21 is trimmed, but it is believed that the cut out of the frame 21 before formation will be more efficient.

Figure 9:
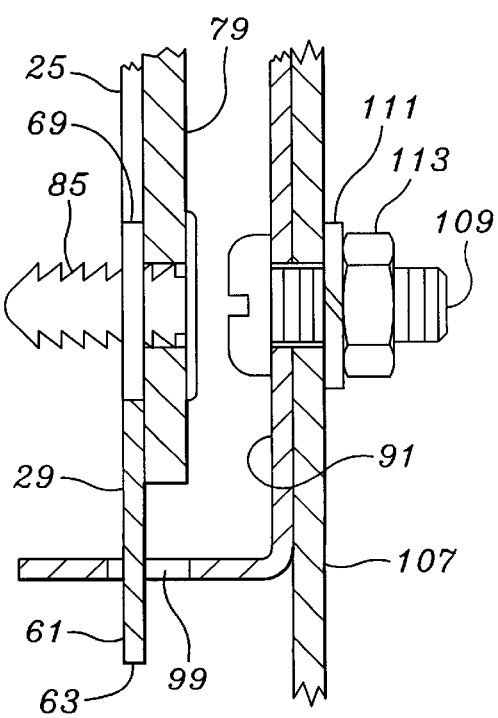
FIG. 9 is a side sectional view taken along line 9—9 of FIG. 7 of the bottm of the frame and tab extending through a tab slot and illustrating the clearance behind the tab to facilitate insertion of the tabs into the tab slots at an angle before being brought to a vertical position.

Referring to FIG. 9, a sectional view along line 9—9 of FIG. 7 illustrates the relationship of the tab 61 within the tab slot 99, and that the greater clearance when the frame 21 is in vertical position is just behind the tab 61.

Figure 10:
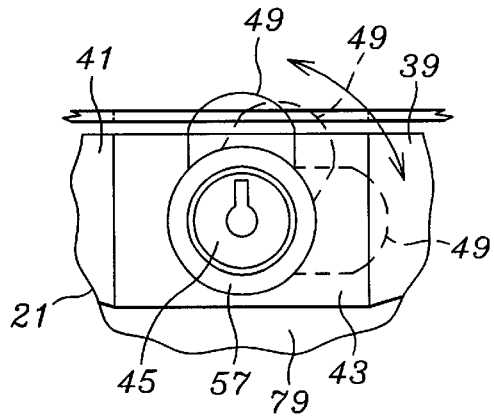
FIG. 10 is front view illustrating operation of a cam lock shown pivoting into a locking position with respect to a bracket.

Referring to FIG. 10, a front view of the frame 21 illustrates the operation of the cam member 49 and the lock 45, but with the key 53 removed to better show the movement and action.

Figure 11:
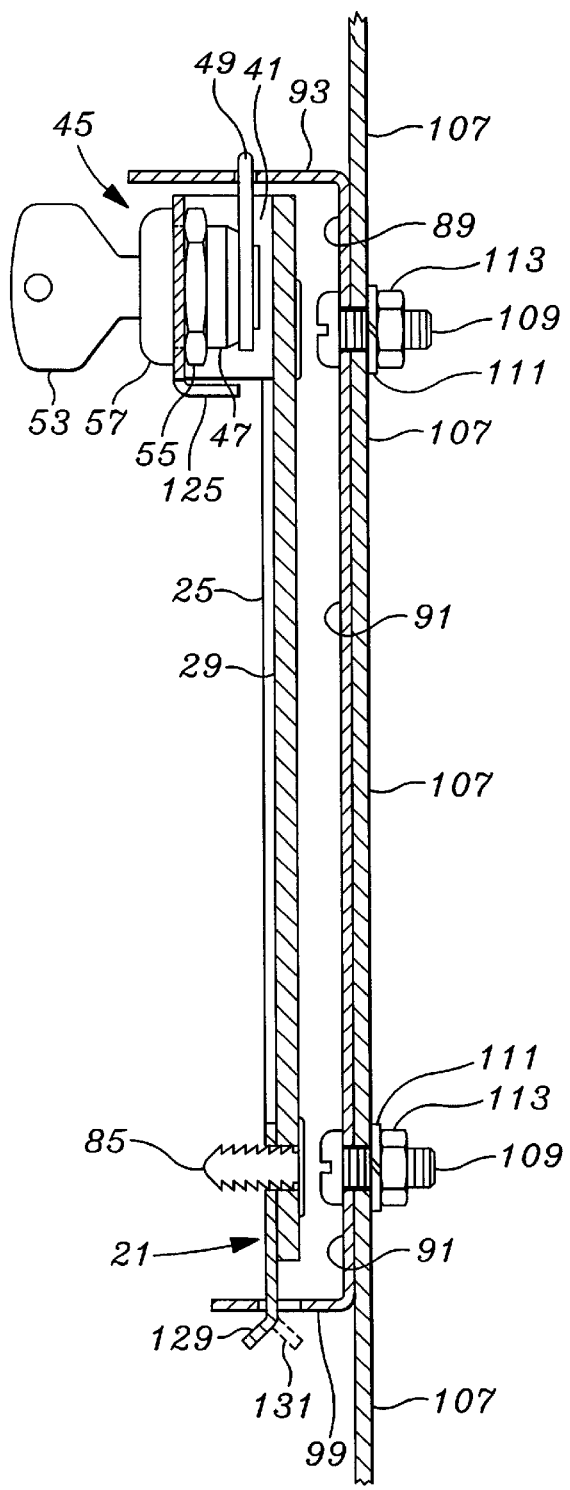
FIG. 11 is a side view similar to that seen in FIG. 8 but illustrating a blocking member underneath and across the top center portion, and also illustrating a tab which may be curved forward or backward to further conserve vertical clearance spaces.

Referring to FIG. 11, some dimensional variation of the system 19 is seen. In FIG. 11 a small portion of metal which would otherwise be cut to form lower edge 115 is allowed to be folded under the lock 45 as a blocking member 125 which prevents under side access of the locking nut 55. The length of the blocking member 125 need only be as long as the thickness of the locking nut 55. In addition, a non-straight, curving or angled tab 129 is seen which extends through tab slot 99. The curvature or angled nature of the tab 129 takes up less space underneath the lower planar portion 95 of the bracket 89. Dashed line format, indicated by numeral 131 illustrates that a tab 131 can be made which is angled rearwardly, but may either be more difficult to engage the frame 121, or alternatively require a wider tab slot 99.

Figure 12:
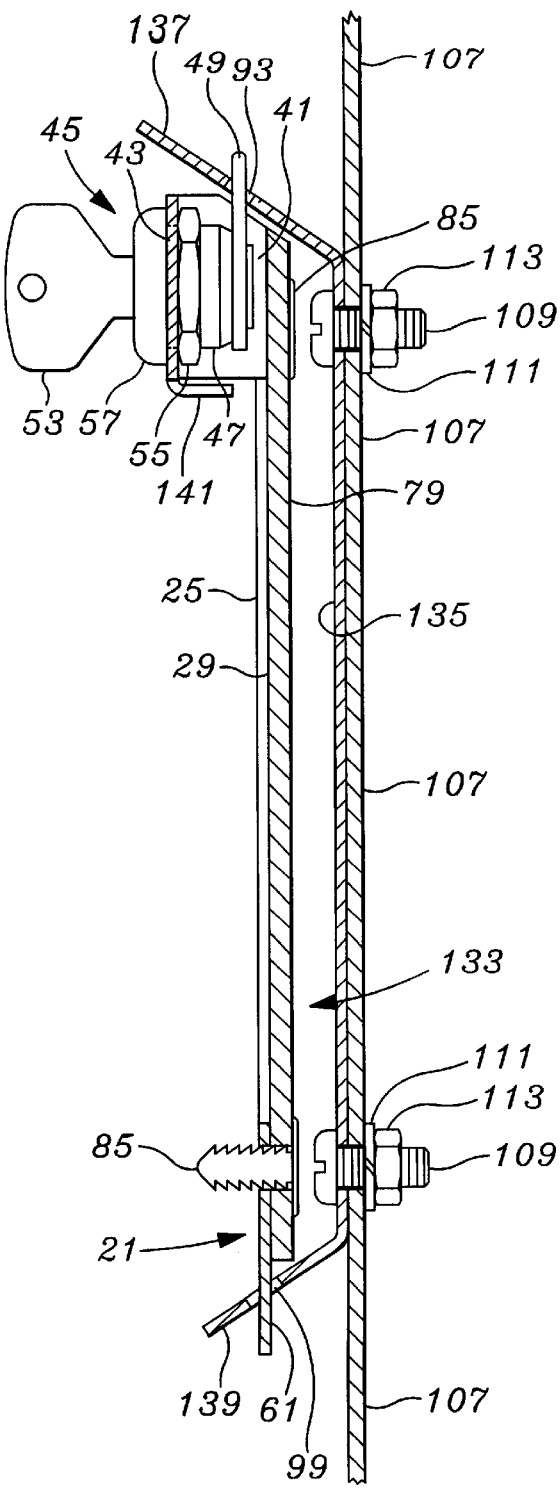
FIG. 12 is a figure similar to FIG. 11 but illustrating a bracket having an upper planar portion and lower planar portion which is at an angle of greater than 90° with respect to the main planar portion, especially for use where the surrounding areas of the license plate security system of the present invention have less height restriction, and also illustrating a forked blocking member underneath and across the ends of the top center portion in order to leave an increased clearance for a locking nut securing the lock of the invention.

Referring to FIG. 12, a bracket 133 includes a main planar portion 135, an upper planar portion 137 which can be at an angle of from about 35° to about 90°, but which is shown at an angle of approximately 45° with respect to the main planar portion 135, and a lower planar portion 139 which can be at an angle of from about 35° to about 90°, but which is shown also at an angle of approximately 45° with respect to the main planar portion 135. This configuration can be used where the area available on the vehicle is greater and will accommodate a system 19 having greater height. Having to bend the bracket 133 to a less severe angle helps facilitate the manufacturing of the bracket 133.

In addition, instead of a blocking member 125 which extends the width of the top center portion 43, a pair of blocking forks 141, one of which is seen in FIG. 12 take up about one fourth of the width of the top center portion 43 each to leave a central space open for the locking nut 55 to clear. The blocking forks 141 are sufficient to prevent tampering from below the lock, but leave the central half of the width of the top center portion 42 open to facilitate clearance of the locking nut 55 and particularly the "points" of the locking nut 55 between any two adjacent flats which constitute the greatest distance from radial center and are limiting in considering the minimum clearance required to turn the locking nut.

Figure 13:
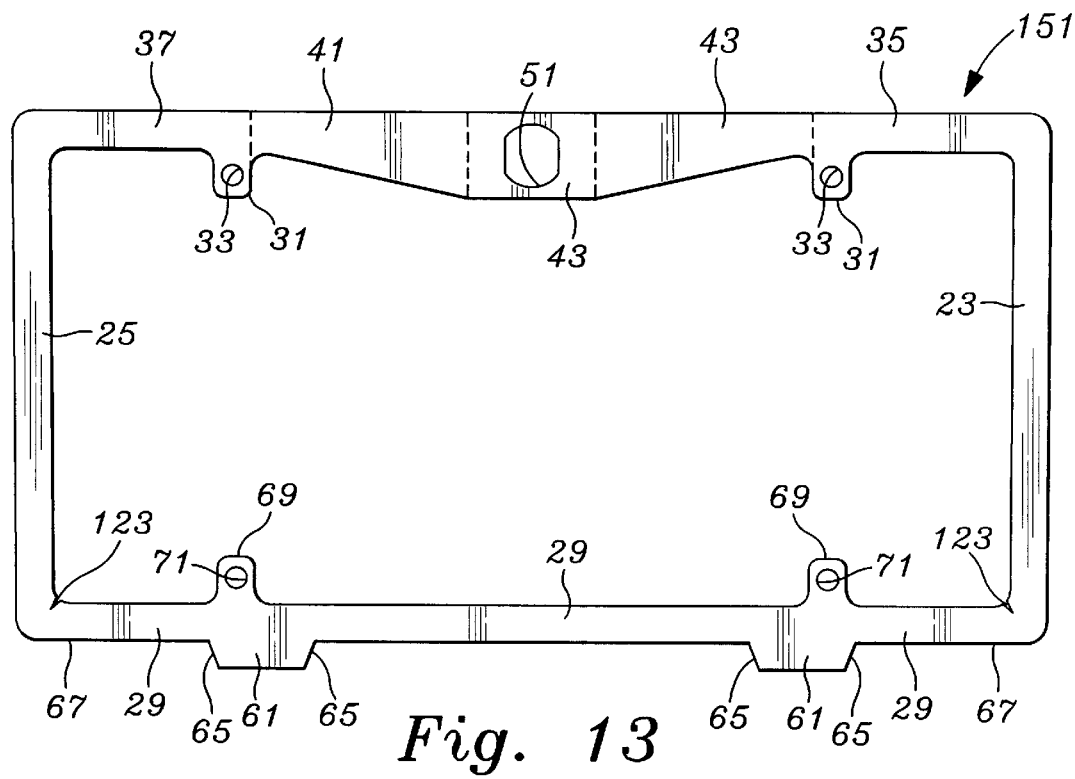
FIG. 13 is the frame seen in FIGS. 1–4 in flat form before formation of the top right angled portion, top left angled portion and top center portion which angles from a main plane of the frame and which has an outside shape as a slight trapezoid in order to form a rectangular shape after formation of the top right angled portion, top left angled portion and top center portion.

Referring to FIG. 13, a flat cutout 151 of frame 21 is illustrated, before the bending of the upper portion to form top right angled portion 39, top left angled portion 41, and top center portion 43. The trapezoidal nature of the cutout 151 is very slight. For a frame 21 to have a final width at the top and bottom of about 12.09 inches, the cutout 151 would have a top width of about 12.195 inches and a bottom width of about 12.09 inches. This is based upon a rising height of the top center portion 43 over the plane of the other flat portions of the frame 21 of about 0.5 inches. Locks 45 of greater length require greater height of the top center portion and require a more severe trapezoidal starting shape.

Figure 14:
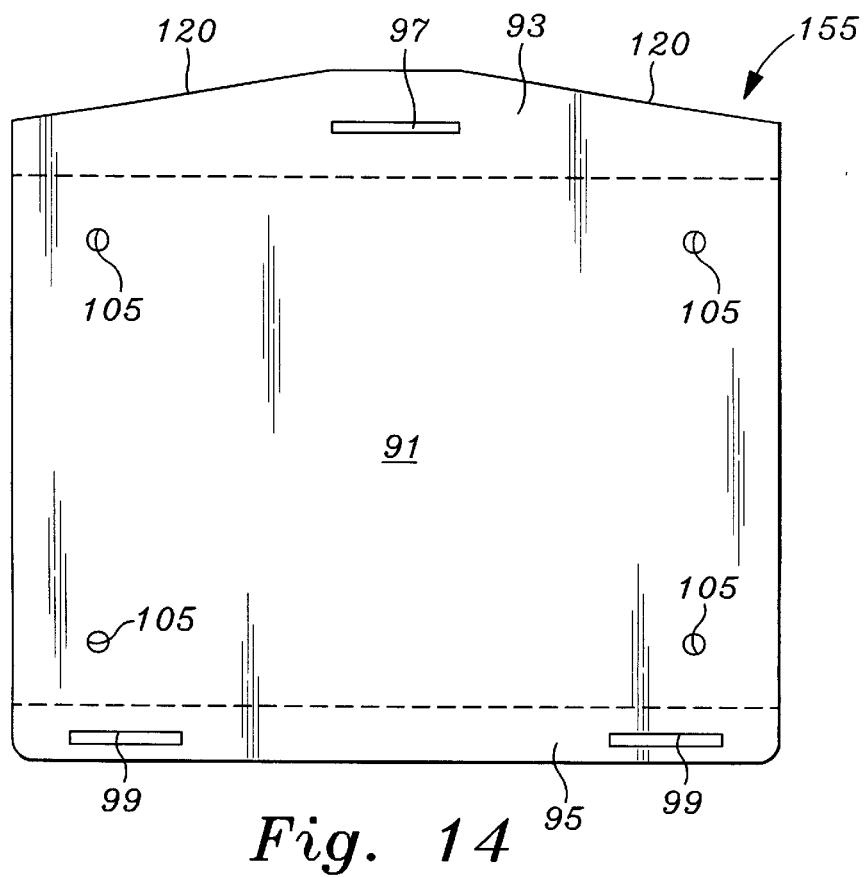
FIG. 14 is the bracket seen in FIGS. 1–4 in flat form before bending of the upper and lower planar portion.

Referring to FIG. 14, a view of a flat cutout 155 for the bracket 89 is illustrated, and having the angled notches 120, before the bending of the upper planar portion 93 and lower planar portion 95 into an angled position with respect to the main planar portion 91.

Figure 15:
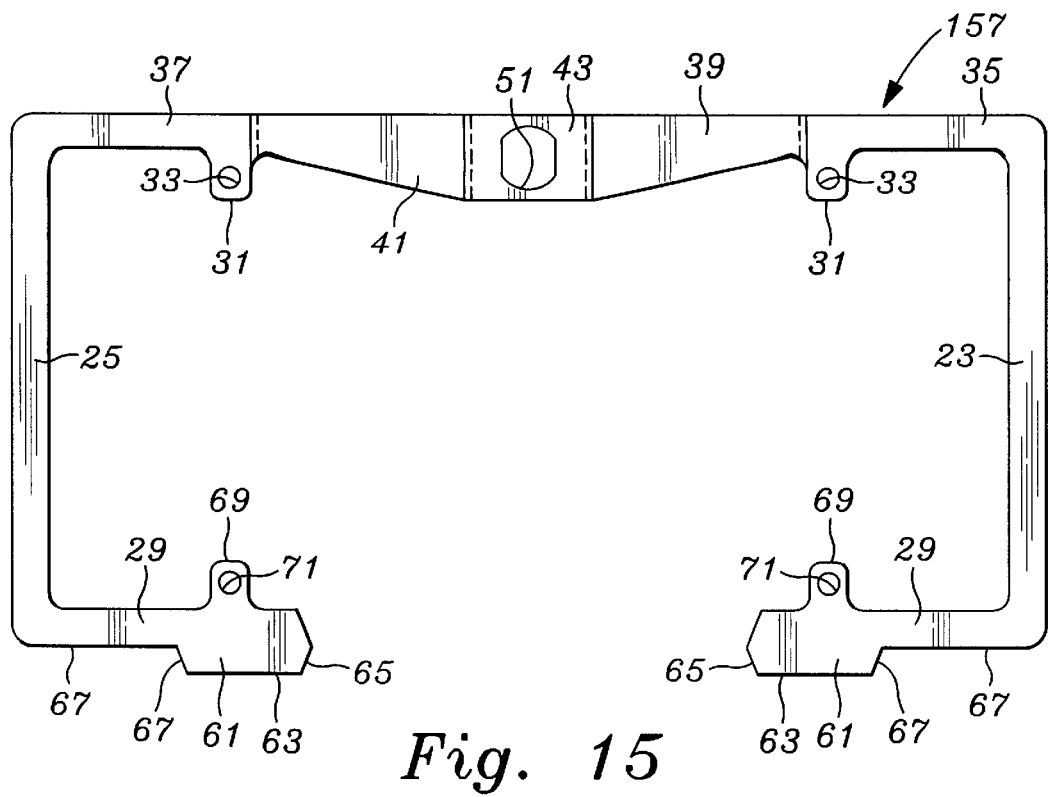
FIG. 15 is a frame similar to the frame of FIGS. 1–4 and 13 but wherein a section of the bottom extent is removed in order to eliminate the need for formation of a slightly trapezoidal flat form before bending as was seen in FIG. 14 and to thus form an open frame.

Referring to FIG. 15, a view of a flat cutout 157 for a variation on the frame 21 is illustrated, but which will result in the same structure seen in FIGS. 1–4 except that the bottom portion 29 has a middle section thereof removed. The result is that the flat cutout 157 does not need to be trapezoidal. The flat cutout 157 will have a bottom and top width which is ideally the same, both being wider by an amount which will be taken up when the upper portion is bent to form top right angled portion 39, top left angled portion 41, and top center portion 43. The lateral reduction in width due to the bending pulls both the right portion 23 and left portion 25 toward each other but in parallel fashion since there is a gap at the bottom of the frame 21.

Figure 16:
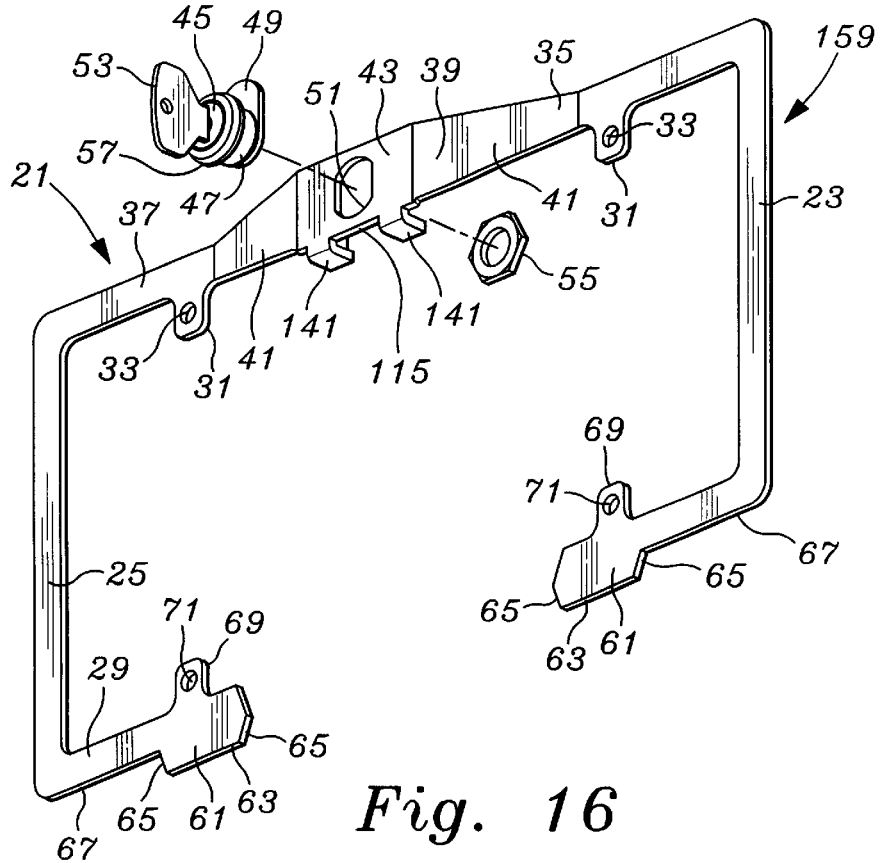
FIG. 16 is a frame the same as was shown in FIGS. 1–4, but with a center section of the bottom portion taken away in order to yield more viewing area of the license plate, as well as to eliminate the need to begin manufacture with a trapezoidally shaped frame, possibily to eliminate the need to provide stress relief notches for the four or two corners of the frame to relieve stress in the trapezoid to square transformation on bending, and finally to facilitate more severe angled bends in the frame upper portion as will be seen in FIGS. 17 and 18.

Referring to FIG. 16, a frame 159 is seen as resulting from the flat cutout 157 and in which the middle of the bottom portion 29 is missing. The tabs 61 may be offset or centered with respect to the lugs 69 and this arrangement may also be shifted by a widening of the bracket 89. There is such strength in the tab side of any of the frames 21, 159, and frame version to follow, as well as in the bracket 89, that non-centering of the tabs 61, as well as the provision of additional tabs 61 is not believed to seriously affect the performance of the system 19. Structures in frame 159 are identical to those for frame 21 except for the missing center section of bottom portion 29.

Figure 17:
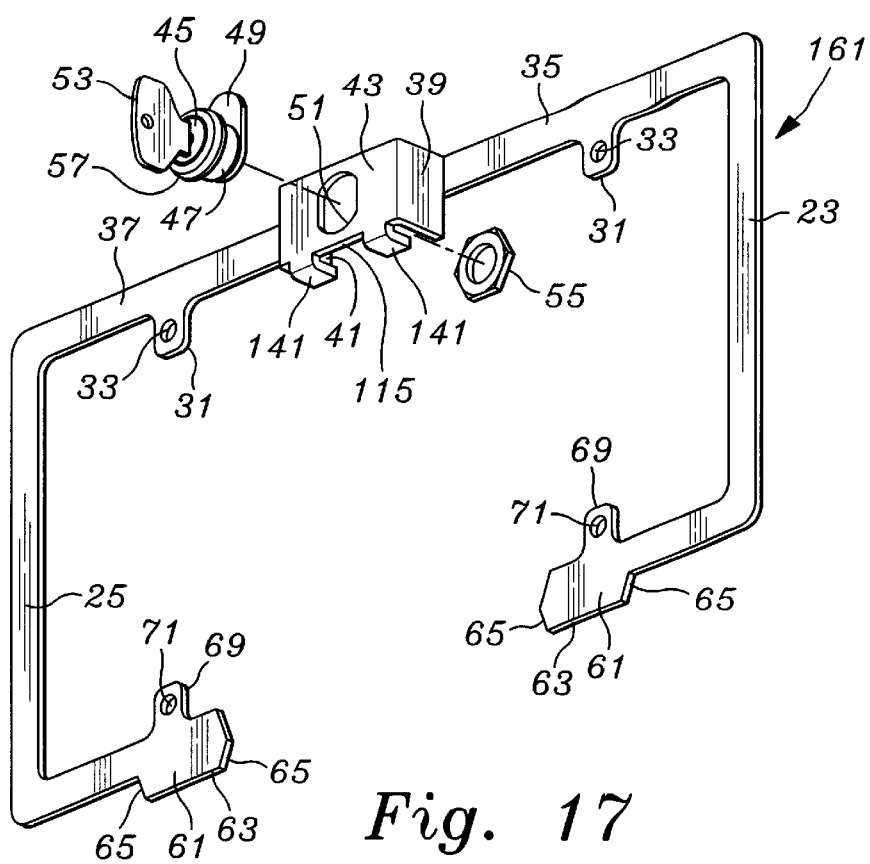
FIG. 17 is a perspective view of frame similar to the frame of FIG. 16 in that a section of the bottom extent is removed, but wherein the top right angled portion, top left angled portion and top center portion are much more angled, with bends approaching a right angle and further illustrating a pair of short lengths of blocking material forming a blocking fork and bending underneath the top center portion in order to leave an increased clearance for a locking nut securing the lock of the invention.

Referring to FIG. 17, a slightly more different version of a frame is shown as frame 161 having a more severely angled top right angled portion 39, a more severely angled top left angled portion 41, and a slightly wider top center portion 43. The top right angled portion 39 and top left angled portion 41 are at right or near right angles with respect to the top right portion 35 and top left portion 37. The increased width of the top center portion 43 is to insure that the cam member 49 can complete its rotation without interference from the more severely angled top right angled portion 39 or more severely angled top left angled portion 41. The more severe angled relationship between top right portion 35 and top right angled portion 39, between top right angled portion 39 and top center portion 43, between top center portion 43 and top left angled portion 41, between top left angled portion 41 and top left portion 37, creates a severe change in width of the frame 161 between its flat cutout width and its width after folding. Even where the lock has a very shallow length, requiring only 0.5 inches displacement of the plane top center portion, an additional inch will be required before bending. This more extreme change in width is facilitated by the opening along the bottom portion 29. Blocking forks 141 are also seen.

Figure 18:
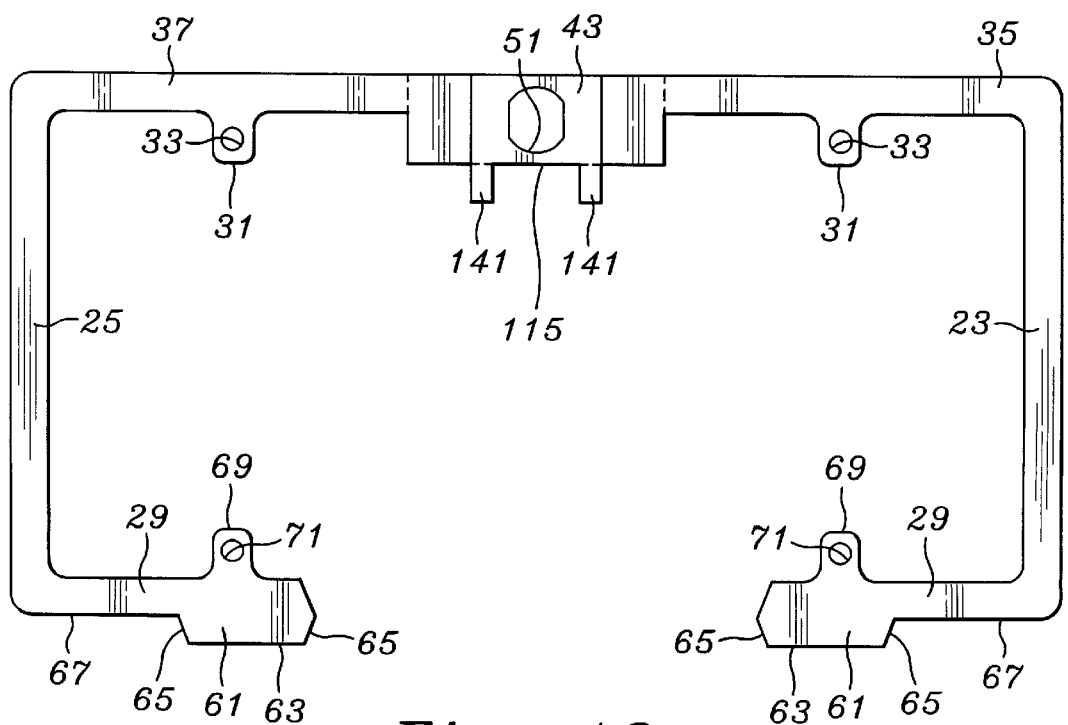
FIG. 18 illustrates a frame made from the flat cutout of FIG. 17, prior to bending and also wherein a section of the bottom extent is removed in order to eliminate the need for formation of a slightly trapezoidal flat form before bending as was seen in FIG. 14 to form an open frame, but also showing the details of the top center portion and the blocking forks before being bent under the lock space.

Referring to FIG. 18, a view of a flat cutout 165 for a variation on the frame 161 is illustrated, but which will result in the same structure seen in FIGS. 17. Again the flat cutout 157 does not need to be trapezoidal, and this is even more important given the severity of angle of the structures including top right angled portion 39, top left angled portion 41, and top center portion 43. Again, once the license plate 79 is attached to the frame 161 or frame 21, stability of the bottom portion will be even more secure. In fact, given the use of tabs 61 within the tab slots 99 stabilize any movement of the sections of the bottom portions 29, adequate structural integrity is had with respect to the bracket 89 with any frame 21 or 161 whether the bottom portion 29 is continuous or not. The section of the bottom portion 29 removed at the middle, for frames 159 and 161, is helpful for some users who display county or other subdistrict at the bottom of the license plate.

While the present invention has been described in terms of a security system for vehicle license plates the structure and techniques of the present invention can be applied to many similar appliances. The present invention may be applied in any situation where lockable encasement of an object is desired in a configuration yielding little or no depth and where no significant additional width or height may be hand, and wherein the object being lockably encased is both defined in size and has non-violatable physical integrity. It is especially useful where the ultimate security may be afforded by removability, and where removability and mobility will facilitate proper alteration, cleaning and maintenance.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed:

1. A license plate security system comprising:
   a bracket having a first slot spaced apart from a second slot;
   a frame having a first side including a tab extending from said first side for insertion into said first slot and a second linear side, said frame having support structure for supporting a vehicle license plate; and
   a lock supported by said frame within said second linear side and having an engagement member operable to lockably extend beyond said second linear side and insert into said second slot to lock said frame into said bracket.

2. The system as recited in claim 1 wherein said engagement member is rotatable into lockable insertion into said second slot to lock said frame into said bracket.

3. The system as recited in claim 1 and wherein said frame includes a left side member, a bottom side member and a right side member in a first plane, and a top side member extending from both said left side member and said right side member and extending to a second plane spaced apart from said first plane.

4. The system as recited in claim 3 wherein said lock extends through said second plane and does not extend, in the direction of said first plane beyond said first plane.

5. The system as recited in claim 3 wherein said top side member includes a top left angled portion having a first end connected to said left side member and a second end, a top right angled portion having a first end connected to said right side member and a second end, and a top center portion having a first end connected to said second end of said top left angled portion and a second end connected to said second end of said top right angled portion.

6. The system as recited in claim 3 and wherein a portion of said top side member extending to said second plane spaced apart from said first plane supports said lock.

7. The system as recited in claim 6 and further comprising a blocking member supported by said frame and extending adjacent said lock.

8. The system as recited in claim 1 and wherein said bracket has a third slot lying in a same plane as said first slot and wherein said frame has a first tab extending from said first side for insertion into said first slot and a second tab extending from said first side for insertion into said third slot.

9. The system as recited in claim 1 and wherein said tab is at least one of angled and curved with respect to a plane of said frame.

10. A license plate security system comprising:
    a bracket having a first slot spaced apart from a second slot;
    a frame having a first side including a tab extending from said first side for insertion into said first slot and a second side, said frame having support structure for supporting a vehicle license plate; and
    a lock supported by said frame and having an engagement member operable to lockably insert into said second slot to lock said frame into said bracket and wherein said frame has a first surface facing away from said bracket and a second surface facing toward said bracket and wherein said second side extends toward said bracket to a greatest extent generally in a first plane and is spaced from said bracket to a greatest extent generally in a second plane and wherein said lock is located on a side of said first plane opposite said bracket and wherein said engagement member is located on a side of said second plane toward said bracket.

11. A license plate security system comprising:
    a bracket having a first slot spaced apart from a second slot;
    a main planar portion for attachment to a vehicle in a configuration to be attached lieu of a license plate;

a first planar portion angled from said main planar portion and which includes said first slot; and a second planar portion angled from said main planar portion and which includes said second slot;

a frame having a first side including a tab extending from said first side for insertion into said first slot and a second side, said frame having support structure for supporting a vehicle license plate;

a lock supported by said frame and having an engagement member operable to lockably insert into said second slot to lock said frame into said bracket.

12. The system as recited in claim 11 wherein said first and said second planar portions each extend from said main planar portion at a substantially right angle.

13. The system as recited in claim 11 wherein said first and said second planar portions each extend from said main planar portion at an angle from about 35° to about 90°.

14. A license plate security system comprising:

a bracket having a locking engagement structure, a first and second slot in a common plane and spaced apart from said first slot;

a frame having a central opening and a first side extending to a first bottom side portion and including a first tab extending from said first bottom side portion for insertion into said first slot, and a second side extending to a second bottom side portion and including a second tab extending from said second bottom side portion for insertion into said second slot, said frame having support structure for supporting a vehicle license plate;

a lock supported by said frame and having an engagement member operable to lockably insert into said locking engagement structure to lock said frame into said bracket when said first and second tabs are engaged with said first and said second slots.

15. The system as recited in claim 14 wherein said frame has a first side facing away from said bracket and a second side facing toward said bracket and wherein said second side extends toward said bracket to a greatest extent generally in a first plane and wherein said lock is located on a side of said first plane opposite said bracket.

16. The system as recited in claim 14 and wherein said frame includes a left side member, and a right side member in a first plane, and a top side member extending from both said left side member and said right side member and extending to a second plane spaced apart from said first plane.

17. The system as recited in claim 16 wherein the bulk of said lock lies between said second plane and said first plane.

18. The system as recited in claim 16 wherein said top side member includes a top left angled portion having a first end connected to said left side member and a second end, a top right angled portion having a first end connected to said right side member and a second end, and a top center portion having a first end connected to said second end of said top left angled portion and a second end connected to said second end of said top right angled portion.

19. The system as recited in claim 16 and wherein a portion of said top side member extending to said second plane spaced apart from said first plane supports said lock.

20. The system as recited in claim 19 and further comprising a blocking member supported by said frame and extending adjacent said lock.

21. The system as recited in claim 14 and wherein said first and said second tabs are at least one of angled and curved with respect to a plane of said frame.

22. A license plate security system comprising:

a bracket having a first slot spaced apart from a second slot, a main planar portion for attachment to a vehicle in a configuration to be attached lieu of a license plate, a first planar portion angled from said main planar portion and which includes said locking engagement structure, and a second planar portion angled from said main planar portion and which includes said first slot and said second slot;

a frame having a first side including a tab extending from said first side for insertion into said first slot, said frame having a second side, said frame having support structure for supporting a vehicle license plate; and a lock supported by said frame and having an engagement member operable to lockably insert into said second slot to lock said frame into said bracket.

23. The system as recited in claim 21 wherein said first and said second planar portions each extend from said main planar portion at an angle from about 35° to about 90°.

24. A license plate security system comprising:

a lock having a locking engagement member a frame having a central opening, a first side and a second side, a first side edge, a bracket engagement structure and a license plate engagement structure and supporting said lock between said first side and said second side, such that said locking engagement member of said lock is supported away from said second side of said frame, said locking engagement member enabled to move below said first side edge when said frame is in an unlocked position; and a bracket having an upper linear extent and a main planar expanse and having a locking engagement structure for engaging said locking engagement member, a first frame engagement structure interfittable with said bracket engagement structure for preventing movement of said one side edge of said frame parallel to said side edge of said frame or lateral to said side edge of said frame when said locking engagements member of said lock lockably engages said locking engagement structure of said bracket, said lock lockably engaging said locking engagement structure with said lock spaced apart from said main planar expanse of said bracket, said bracket engagement structure spatially configured to permit movement of said frame sufficient to enable said locking engagement member of said lock to lockably engage and lockably disengage said locking engagement structure of said bracket.

25. The system as recited in claim 24 and wherein said bracket engagement structure is a protruding member and wherein said first frame engagement structure of said bracket is a void complementary to and interfittable with said bracket engagement structure of said frame.

26. The system as recited in claim 24 and wherein said movement of said frame sufficient to enable said locking engagement member of said lock to lockably engage and lockably disengage said locking engagement structure of said bracket is a pivoting movement.

27. The system as recited in claim 24 and wherein said lock is a cam lock and said locking engagement member is a cam locking member.

28. The system as recited in claim 24 and wherein said frame has an open shape.

29. The system as recited in claim 14 wherein said first bottom side portion is spaced apart from said second bottom side portion.

* * * * *